C. C. GLADWIN.
MITER BOX.
APPLICATION FILED OCT. 6, 1913.
1,089,761. Patented Mar. 10, 1914.
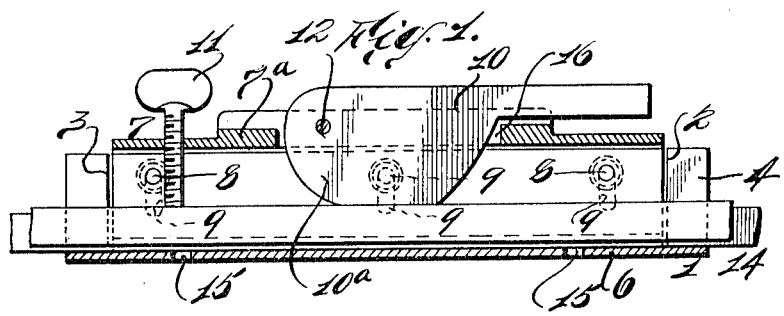
Witnesses:
C. A. Jarvis
Ruth Meyers
Inventor
Charles Clinton Gladwin.
by
attorney

UNITED STATES PATENT OFFICE.

CHARLES CLINTON GLADWIN, OF NEW YORK, N. Y.

MITER-BOX.

1,089,761.  Specification of Letters Patent.  Patented Mar. 10, 1914.

Application filed October 6, 1913.  Serial No. 793,604.

*To all whom it may concern:*

Be it known that I, CHARLES CLINTON GLADWIN, a citizen of the United States of America, residing at New York city, borough of Manhattan, county and State of New York, have invented certain new and useful Improvements in Miter-Boxes, of which the following is a full, clear, and exact description.

This invention relates to an improved gage and clamp combined, the object being to provide a device of this character that will facilitate the cutting or sawing off of molding or, more especially, metal conduits for electrical conductors. My improved device is constructed to receive moldings or conduits of various sizes and can be made of any desired length, special means being provided to clamp the moldings or conduits in place.

I will now proceed to describe my invention in detail, the novel features of which I will point out in the appended claims, reference being had to the accompanying drawing, forming part hereof, wherein:—

Figure 1 is a longitudinal sectional view of my improved device, the section being taken on a line 1—1 in Fig. 2; Fig. 2 is a top plan view thereof; Fig. 3 is a rear view thereof; and Fig. 4 is an enlarged cross-sectional view, the section being taken on a line 4—4 in Fig. 3.

The device as herein illustrated is embodied in the form of a miter-box, that is to say, it consists of a channeled receptacle provided with transverse slots for the passage of a saw, the said slots being in this instance disposed at a right angle to the sides of the receptacle or box.

Referring to the drawing, the receptacle or box is indicated by 1 and the transverse slots by 2 and 3. The box 1 preferably consists of upstanding walls 4 and 5 and a bottom 6, the slots 2 and 3 being cut in the walls 4 and 5.

To firmly hold the molding or conduit in the box, I provide a bracket 7 carried by (in this instance) the wall 4. The bracket 7 consists of a cover-plate $7^a$ which extends from a supporting-plate $7^b$. To render the bracket 7 adjustable vertically, I secure the same to the wall 4 by means of set-screws 8 which pass through slots 9 in the supporting plate $7^b$.

The bracket 7 carries a clamping-lever 10, provided with a cam $10^a$, and a clamping screw 11. The lever 10 is pivoted to the bracket 7 at 12 and is adapted to be swung upwardly to release a molding or conduit and for the insertion of the same, and downwardly to clamp the inserted molding or conduit. The screw 11 is used as an auxiliary clamp or it may be used to clamp the molding or conduit without the use of the clamping lever 10. It is obvious that the lever 10 and clamping screw 11 act to hold the article to be cut down against the bottom 6. The lever 10 is used to clamp conduits of standard thickness, and in this event can be used without the screw 11. The clamping screw 11 can be used to hold moldings or conduits of various thicknesses. To hold the article to be cut against the wall 4, I employ clamping screws 13. A portion of an electrical conduit is indicated by 14. Should it be desirable to secure the gage to a table or support, I provide the bottom of same with openings 15 through which screws can be passed. By adjusting the bracket 7 vertically, the lever 10 is rendered adaptable for clamping conduits of different thicknesses, but it is somewhat more limited in this respect than the screw 11.

I provide a guide-slot 2 and 3 at each end so as to render the gage operable in the hands of either a right or left-handed workman. When a molding or conduit is clamped in the box, a saw is placed in the slot 2 or 3 and the said molding or conduit cut with a greater degree of accuracy than if laid upon a table and cut to a mark. As can be seen in Fig. 1 the cam $10^a$ on the lever 10 passes through a slot 16 in the cover $7^a$.

Having now described my invention, what I claim and desire to secure by Letters Patent is:

1. A miter-box comprising a channeled receptacle provided with guide slots in the side walls thereof, said side walls being of different heights, a vertically adjustable support carried by the higher of said side walls and located intermediate said slots, said vertically adjustable support consisting of a supporting plate provided with slots, binding screws passing through said slots and engaging the adjacent side wall, a cover plate carried by said supporting plate extending over the gap between said side walls, said cover plate being provided with a slot, a lever pivoted in said slot, a clamping cam carried by said lever and extending into said gap, and auxiliary clamping screws carried by the lower side wall.

2. A miter-box comprising a channeled receptacle provided with guide slots in the side walls thereof, said side walls being of different heights, a vertically adjustable support carried by the higher of said side walls and located intermediate said slots, said vertically adjustable support consisting of a supporting plate provided with slots, binding screws passing through said slots and engaging the adjacent side wall, a cover plate carried by said supporting plate extending over the gap between said side walls, said cover plate being provided with a slot, a lever pivoted in said slot, a projection carried by said lever extending into said gap, a portion of said extension consisting of a clamping cam and a straight portion extending therefrom in parallelism with the bottom surface of said gap, an auxiliary clamping screw carried by the cover-plate of said support, and auxiliary clamping screws carried by the lower wall.

Signed at New York city, N. Y., this 4th day of October, 1913.

CHARLES CLINTON GLADWIN.

Witnesses:
RUTH MEYERS,
MAURICE BLOCK.

Copies of this patent may be obtained for five cents each, by addressing the "Commissioner of Patents, Washington, D. C."